June 21, 1955 — F. M. PARKER, SR — 2,711,064
GRASS TRIMMER
Filed Aug. 16, 1954
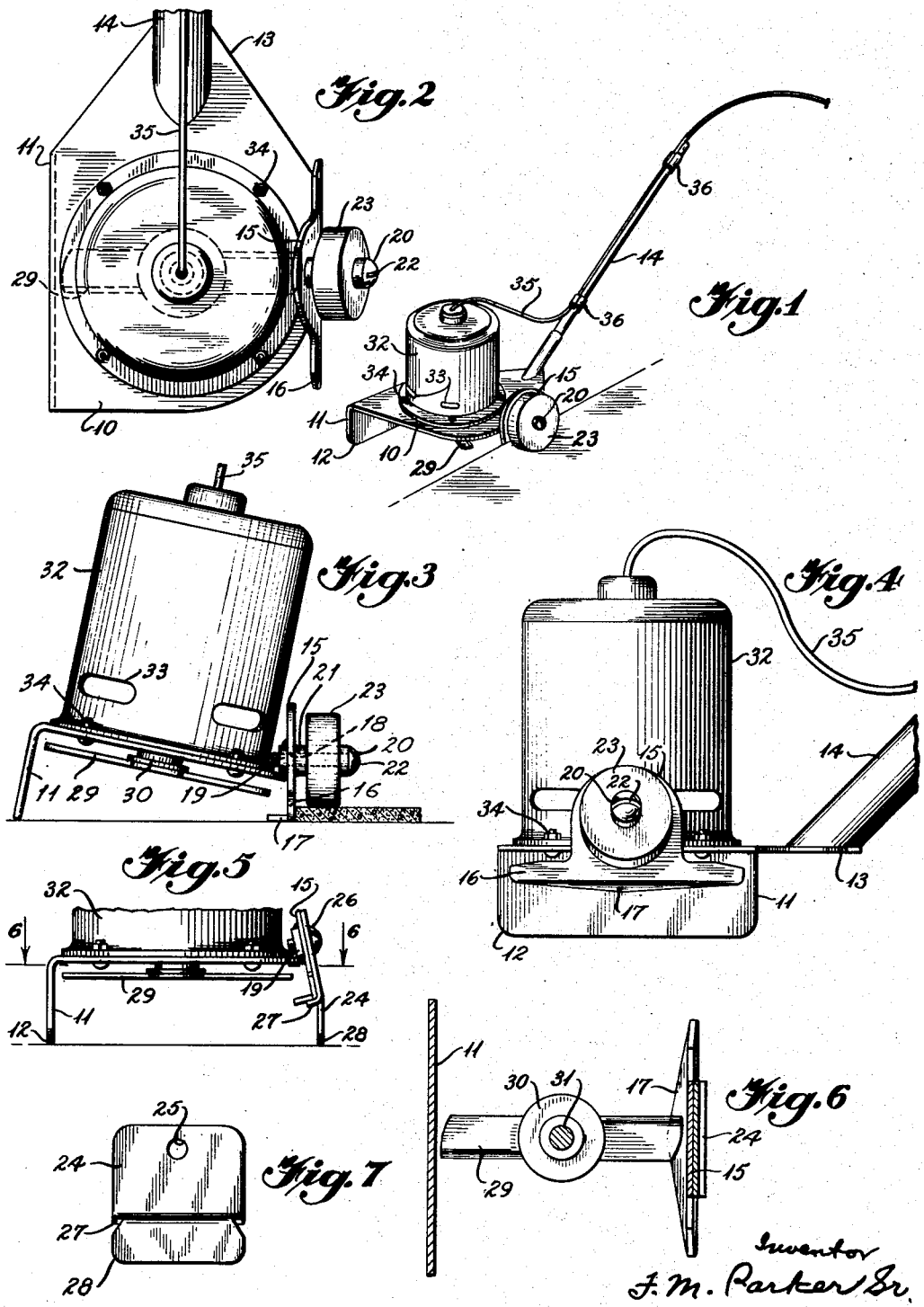
Inventor
F. M. Parker Sr.

United States Patent Office 2,711,064
Patented June 21, 1955

2,711,064

GRASS TRIMMER

Frank M. Parker, Sr., Chambersburg, Pa.

Application August 16, 1954, Serial No. 449,848

7 Claims. (Cl. 56—25.4)

This invention relates to landscape gardening and more particularly to maintaining grass trimmed on lawns, along walks, curbs, and the like. Specifically the invention relates to a grass trimmer for cutting grass in places where a lawn mower cannot be used.

Lawn mowers employed on normal expanses of lawns are used to cut the grass over the major expanses of the lawns. However, they leave uncut certain areas, such as close to buildings, along the edges of walks, driveways, sidewalks, curbs, and the like. Such areas usually are cut with shears by hand and is tedious, exhausting and time-consuming.

It is an object of the invention to provide a grass trimmer of simple and inexpensive construction which will require minimum effort in its use, will efficiently perform the work for which intended, and can be readily converted to cut grass the same height as a standard lawn mower.

Another object of the invention is to provide a grass trimmer having means to pick up blades of grass and direct them to the cutting blade, which can be quickly converted from a trimmer having a wheel which rolls on top of a walk, curb, driveway, or the like, to a lawn mower which will cut a swath the same height as a standard machine and will also when not converted to a flat lawn mower cut grass from the sidewalk level on a taper up to a standard lawn mower height.

Another object of the invention is to provide a grass trimmer which will cut a swath wide enough and at an angle that a standard lawn mower will match in height.

Another object of the invention is to provide a grass trimmer which can be powered either electrically or by an internal combustion engine, and when powered electrically the cord will be maintained out of the way, so that it will not be cut.

A further object of the invention is to provide a grass trimmer with a motor mounting or base plate having a depending side, with a wheel and smaller blade selectively usable at the opposite side so that the trimmer may be used along a walk or curb or as a flat mower.

Other objects and advantages will become apparent from the following description taken in conjunction with the accompanying drawings wherein:

Fig. 1 is a perspective view illustrating one application of the invention and its use along a walk, driveway, or curb;

Fig. 2, an enlarged fragmentary top plan view;

Fig. 3, an enlarged front elevation;

Fig. 4, an enlarged side elevation;

Fig. 5, an enlarged fragmentary front elevation with the wheel of Figs. 3 and 4 removed and a skid plate substituted;

Fig. 6, a section on the line 6—6 of Fig. 5; and

Fig. 7, a face view of the skid plate.

Briefly stated, the invention comprises a base plate with a depending skid forming side, a combination bracket and grass guide at its opposite edge for guiding grass into position to be cut and for the selective attachment either of a curb-contacting wheel or a skid blade. On the base plate is mounted a power plate in the form of an electric motor or gasoline engine with a vertical driven shaft having a horizontally disposed cutting blade at its lower end. A handle is provided for the propulsion of the trimmer and when an electric motor is employed for supplying the power to the cutter the cord is preferably clamped to and extended up over the handle so that it will not be in the way or a position to be accidentally engaged by the cutter blade.

With continued reference to the drawing, the grass trimmer of the present invention comprises a base plate 10 having a depending ground-engaging side or skid 11 with rounded corners 12. This base plate forms a support for the other parts of the machine and has a tapered extension 13 to which a handle 14 is welded or otherwise secured.

The base plate is provided at its opposite edge with a pick up shoe or combination bracket and grass guide 15 welded or otherwise secured to the base plate. This combination bracket and grass guide is disposed vertically and the frame and motor are disposed at an angle. In order to guide or pull the blades of grass into a position to be cut the combination bracket and grass guide 15 is provided with a relatively long and narrow substantially upright lower portion 16 and a transverse or horizontally extending portion 17 tapered from its center, of greater width, to its extremities of narrower width and forming substantially tapering points which pass under the blades of grass and raise or pull them into position to be cut.

The combination bracket and grass guide is provided with a central opening 18 about which, on the inner side of the bracket, is welded or otherwise secured in internally threaded nut or plate 19 for the reception of a journal or bolt 20 carrying a spacing member 21, said journal or bolt having a screwdriver slot 22 so that such journal or bolt may be screwed into position with the roller 23 thereon adapted to engage and roll along a walk, curb, or other surface.

Instead of the roller 23 the combination bracket and grass guide may have a skid plate 24 attached thereto, said skid plate having an opening 25 for the reception of a journal or fastening screw 26 for attaching the skid plate to the bracket. The skid plate is provided with a pair of laterally extending ears 27 which engage the bottom surface of the grass guide and prevent relative movement of the skid plate when it is fastened in position. The skid plate likewise is provided with rounded corners 28 to prevent digging into the surface of the ground on which it is supported. Also, the bottom of the skid plate is located from the base plate substantially the same distance as the depending edge of the base plate, to thereby support the base plate in substantially horizontal position.

A cutter blade 29 is adapted to be disposed in a horizontal position beneath the base plate 10 and 1¼ inches above the ground, in order to cut grass a corresponding length. This cutter blade 29 is supported by a ring 30 carried on the lower end of the vertical shaft 31 of a motor 32 of any desired character, electric or otherwise, and such motor, which in the present case is an electric motor preferably is provided with ventilating openings 33, the casing of which is secured to the base plate 10 by means of bolts 34. Power may be supplied to the motor through a cord or conductor 35 extended upwardly along the handle and secured thereto by clamps 36 so that said cord 35 will be maintained out of the way and not be cut by the rotating cutter blade 29.

It will be understood from the foregoing that the present invention includes a power plant mounted on a base supported at opposite side edges by depending portions, one being a combination bracket and grass guide to which a roller or a skid may be selectively applied, the roller being employed where there is a slightly raised surface such as a walk or a curb, and a skid plate being employed where there is no slightly raised surface but when it is desired to support the base or mounting plate in horizontal position and to cut close to an object such as a building. It will also be apparent that in the use of the grass trimmer the blade guide provides in effect a pickup shoe to guide grass into the path of the cutting blade, and that the device will cut the grass evenly and to a height corresponding to that cut by a conventional lawn mower. Further it will be clear that the particular relation of the parts contributes to the efficiency of the operation and that it is possible to quickly convert from a trimmer to a flat lawn mower resulting in maximum usefulness of the device with minimum effort.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A grass trimmer comprising a base plate having spaced means for supporting the same including an integral depending elongated portion with rounded earth-engaging corners at one edge providing a skid, a combination bracket and grass guide disposed vertically at the opposite edge of said base plate and adapted to receive a curb-engaging roller and a detachable skid also having rounded corners, said combination bracket and grass guide having a portion extending downwardly and laterally beneath said base plate with said laterally extending portion tapering from its center to its extremities and terminating in pointed ends for projection beneath and raising grass into position to be cut, a cutter blade beneath and substantially parallel to said base plate, and a power plant mounted on said base plate and having a driven shaft connected to said cutter blade, and a handle by means of which the device may be operated.

2. A grass trimmer comprising a base plate having spaced means for supporting the same including a depending elongated portion at one edge providing a skid, a combination bracket and grass guide disposed at an angle to the vertical at the opposite edge of said base plate and adapted to receive a roller and a detachable skid, said combination bracket and grass guide having a laterally extending portion tapering from its center to its extremities and terminating in pointed ends for projection beneath and raising grass into position to be cut, a cutter blade beneath and substantially parallel to said base plate, and a power plant mounted on said base plate and having a driven shaft connected to said cutter blade, and a handle by means of which the device may be operated.

3. A grass trimmer comprising a base plate having spaced means for supporting the same including an elongated portion at one edge providing a skid, a combination bracket and grass guide disposed at an angle to the vertical at the opposite edge of said base plate and adapted to receive a roller and a detachable skid, said combination bracket and grass guide having a laterally extending portion tapering from its center to its extremities and providing pointed ends for projection beneath grass for raising the same into position to be cut, a cutter blade beneath and substantially parallel to said base plate, and a power plant mounted on said base plate and having a driven shaft connected to said cutter blade.

4. A grass trimmer comprising a base plate having spaced means for supporting the same including an elongated portion at one edge providing a skid, a grass guide disposed at the opposite edge of said base plate, a roller mounted on said base plate adjacent said grass guide, a cutter blade beneath and substantially parallel to said base plate, and a power plant mounted on said base plate and having a driven shaft connected to said cutter blade, and a handle by means of which the device may be operated.

5. A grass trimmer comprising a base plate having spaced means for supporting the same, including a depending elongated portion at one edge providing a skid, a surface-engaging roller at the opposite edge of said base plate, a grass guide having a laterally extending portion tapering from its center to its extremities and providing pointed ends for projection beneath grass for raising the same into position to be cut, a cutter blade beneath and substantially parallel to said base plate, and a power plant mounted on said base plate and having a connection to said cutter blade.

6. A grass trimmer comprising a base, a power plant mounted on said base, a horizontally disposed cutter blade connected to be driven from said power plant, a skid at one side of said base, and a plate with a journal for supporting a curb-engaging roller at the other side of said base removably mounted at an elevation above the bottom of said skid, said plate also being constructed to support a skid plate at the opposite side of the base.

7. A grass trimmer having a base plate with a downwardly extending portion rounded to prevent its digging into the ground, a cutter, a power plant for driving said cutter, and a pick up shoe on the opposite side of said base plate from said downwardly extending portion and having upright and transversely disposed portions tapering from their extremities to the thickened center portions for bending or pulling the grass into the cutter.

References Cited in the file of this patent

UNITED STATES PATENTS

| | | |
|---|---|---|
| D. 145,438 | Goodall | Aug. 20, 1946 |
| 2,472,414 | Geater | June 7, 1949 |
| 2,480,922 | Harshman | Sept. 6, 1949 |
| 2,612,741 | McKay | Oct. 7, 1952 |